United States Patent [19]
Keoshkerian et al.

[11] Patent Number: 5,739,229
[45] Date of Patent: Apr. 14, 1998

[54] POLYMERIZATION PROCESSES

[75] Inventors: Barkev Keoshkerian, Thornhill; Michael K. Georges, Guelph; Peter M. Kazmaier; Gordon K. Hamer, both of Mississauga, all of Canada

[73] Assignee: Xerox Corporation, Stamford, Conn.

[21] Appl. No.: 553,200

[22] Filed: Nov. 7, 1995

[51] Int. Cl.$^6$ ................. C08F 2/00; C08F 4/00
[52] U.S. Cl. ............ 526/215; 526/208; 526/210; 526/222; 526/236
[58] Field of Search ............. 526/215, 208, 526/210, 222, 236

[56] References Cited

U.S. PATENT DOCUMENTS 5,322,912  6/1994  Georges et al. .............. 526/204

OTHER PUBLICATIONS

Kiyoshi Koyama, Masato Nishimura, Polymerization of Mettiacrylic Acid Esters by 7,7,8,8-Tetracyanoquinodimettiane, Makromol. Chem., Rapid Commun. 1, 257–261, 1980.

Primary Examiner—Joseph L. Schofer
Assistant Examiner—Wu C. Cheng
Attorney, Agent, or Firm—John L. Haack

[57] ABSTRACT

A process for the preparation of thermoplastic resin comprising: heating a mixture comprised of a free radical initiator, a stable free radical agent, at least one polymerizable monomer compound and an electron acceptor (EA) compound, to form a thermoplastic resin containing a homopolymeric segment or segments and wherein said process possesses a high monomer to polymer conversion and a narrow polydispersity.

9 Claims, 2 Drawing Sheets

POLYMERIZATION PROCESSES

REFERENCE TO COPENDING APPLICATIONS AND ISSUED PATENTS

Attention is directed to commonly owned and assigned U.S. Pat. No. 5,322,912, issued Jun. 21, 1994, entitled "POLYMERIZATION PROCESSES AND THEIR TONER COMPOSITIONS THEREFROM", wherein there is disclosed free radical polymerization processes for the preparation of a thermoplastic resin or resins comprising: heating from about 100° C. to about 160° C. a mixture comprised of a free radical initiator, a stable free radical agent, and at least one polymerizable monomer compound to form the thermoplastic resin or resins with a high monomer to polymer conversion and a narrow polydispersity; U.S. Pat. No. 5,412,047, issued May 2, 1995, entitled "HOMOPOLYMERIZATION PROCESSES WITH OXONITROXIDES", wherein there is illustrated stable free radical moderated polymerization processes which employ an oxo nitroxide compound which enable the controlled homopolymerization of acrylate and related monomer compounds; U.S. Pat. No. 5,401,804, issued Mar. 28, 1995, which is a divisional application of U.S. Pat. No. 5,322,912, entitled "POLYMERIZATION PROCESS AND TONER COMPOSITIONS THEREFROM"; U.S. Pat. No. 5,449,724, issued Sep. 12, 1995, entitled "Stable Free Radical Polymerization Process and Thermoplastic Materials Produced Therefrom", which discloses high pressure stable free radical polymerization processes for preparing, for example, polyethylene rubbers; and U.S. Pat. No. 5,312,704, issued May 17, 1994, entitled "MONOMODAL, MONODISPERSED TONER COMPOSITIONS AND IMAGING PROCESSES", wherein there is illustrated a toner composition comprised of pigment particles, and a resin prepared by anionic means comprised of a monomodal polymer resin or monomodal polymer resin blends and wherein the monomodal resin or resin blends possess a narrow polydispersity.

Attention is directed to commonly owned and assigned copending applications Application Numbers, U.S. Ser. No. 08/363,083 (D/92579DD) filed Dec. 23, 1994, a divisional application of U.S. Pat. Nos. 5,322,912 and 5,401,804, entitled "POLYMERIZATION PROCESSES AND TONER COMPOSITIONS THEREFROM"; U.S. Ser. No. 08/307, 192 (D/92581), filed Mar. 25, 1993, entitled "SEMISUSPENSION POLYMERIZATION PROCESSES"; U.S. Ser. No. 08/214,518 (D/925791), filed Mar. 18, 1994, entitled "EMULSION POLYMERIZATION PROCESSES AND TONER COMPOSITIONS THEREFROM", a continuation-in-part of U.S. Ser. No. 07/976,604, filed Nov. 16, 1992; U.S. Ser. No. 08/223,418 (D/93729), filed Apr. 4, 1994, entitled "AQUEOUS POLYMERIZATION PROCESSES"; U.S. Ser. No. 08/292,670 (D/94133), filed Aug. 18, 1994, entitled "BIFUNCTIONAL MACROMOLECULES AND TONER COMPOSITIONS THEREFROM"; U.S. Ser. No. 08/317,044 (D/94150), filed Oct. 3, 1994, entitled "INK JETTABLE TONER COMPOSITIONS AND PROCESSES FOR MAKING AND USING"; U.S. Ser. No. 08/345,371 (D/94743), filed Nov. 18, 1994, entitled "POLYMERIZATION PROCESSES"; U.S. Ser. No. 08/348,022 (D/94772), filed Dec. 1, 1994, entitled "POLYMERIZATION MULTIBLOCK COPOLYMER PROCESS AND COMPOSITIONS THEREOF"; U.S. Ser. No. 08/348, 021 (D/94635), filed Dec. 12, 1994, entitled "POLYMERIZATION PROCESS AND COMPOSITIONS THEREOF"; U.S. Ser. No. 08/413,753 (D/95112), filed Dec. 12, 1994, entitled "PROCESS FOR PRODUCING TELECHELIC, BRANCHED AND STAR THERMOPLASTIC RESIN POLYMERS"; U.S. Ser. No. 08/367,636 (D/93728) filed Jan. 3, 1995, entitled "POLYMERIZATION PROCESSES"; U.S. Ser. No. 08/413,663 (D/95113), filed Mar. 30, 1995, entitled "RATE ENHANCED POLYMERIZATIONS"; U.S. Ser. No. 08/413,752 (D/95071), filed Mar. 30, 1995, entitled "STABLE FREE RADICAL POLYMERIZATION UNDER SUPERCRITICAL CONDITIONS AND POLYMERS PRODUCED THEREBY"; and U.S. Ser. No. 08/413,645 (D/94136), filed Mar. 30, 1995, entitled "PROCESSES FOR THE PREPARATION OF BRANCHED POLYMERS".

The disclosures of each the above mentioned patents and copending applications are incorporated herein by reference in their entirety.

BACKGROUND OF THE INVENTION

The present invention is generally directed to processes for the preparation of polymers and copolymers. More specifically, the present invention relates to polymerization processes which provide thermoplastic resin products which possess narrow polydispersity properties and which polymerization processes proceed with enhanced monomer to polymer conversion efficiencies. In particular, this invention relates to stable free radical mediated polymerization processes and which processes afford homopolymeric containing thermoplastics which are not otherwise obtainable, or readily obtainable, in the presence of a nitroxide type stable free radical compound. Thus, the present invention, in embodiments, provides polymerization processes which enable the homopolymerization of relatively low reactivity monomers, for example, acrylate and acrylamide compounds, under stable free radical moderated polymerization conditions.

The present invention provides, in embodiments, a polymerization process for the preparation of thermoplastic resin or resins comprising: heating a mixture comprised of a free radical initiator, a stable free radical agent, at least one polymerizable monomer compound with low free radical reactivity, and an electron acceptor (EA) compound, to form a thermoplastic resin or resins containing a homopolymeric segment or segments comprised of contiguously polymerized low reactivity monomers, with a high monomer to polymer conversion and a narrow polydispersity.

The present invention provides, in embodiments, acrylate and acrylamide containing homopolymers and copolymers with number average molecular weights ($M_n$) above about 100 to about 1,000 and having a polydispersity or ratio of the weight average molecular weight ($M_w$) to the number average molecular weight ($M_n$) of from about 1.0 to about 2.0, and monomer to polymer conversions in excess of 20 to 50 percent.

The present invention provides, in embodiments, a pseudoliving polymerization process that enables the synthesis of narrow polydispersity acrylate and acrylamide containing homopolymers and copolymers, and thermoplastic resins from a variety of moderate to low reactivity free radical reactive unsaturated monomers under known stable free radical polymerization conditions, reference the aforementioned commonly assigned U.S. Pat. No. 5,322,912. The process, in embodiments, uses known free radical initiators in combination with a stable free radical agent, and an electron acceptor (EA) compound.

In other embodiments, the stable free radical agent mediated polymerization processes of the present invention can be used to prepare block copolymers and multi-block polymer having narrow polydispersity properties thereby providing a means for preparing surface active or surfactant materials having well defined polydispersity and hydrophobelipophobe balance (HLB) properties.

The polymer resins produced by processes of the present invention, in embodiments, are essentially monomodal, that is the molecular weight distribution is narrow and indicative of a Poisson character and without shoulders or side bands. In embodiments, by repeating the heating step, comprising a combined initiation and polymerization step, there is provided a process for obtaining monomodal mixtures of polymer resins that are compositionally the same resin type having characteristics of both narrow polydispersity and known or selectable modality greater than 1. In embodiments, the process of the instant invention provides a process for conducting polymerization processes on multikilogram or larger scales. The aforementioned embodiments may be accomplished in a one or single pot reactor environment. In embodiments, although not wanting to be limited by theory, it is believed that the polymeric chain growth proceeds by a pseudoliving mechanism and can provide resins of variable molecular weights from very low to very high, for example, less than about 2,000 and, for example, up to about 100,000 to about 200,000, while maintaining narrow molecular weight distributions or polydispersities. In embodiments, block and multiblock copolymers can be synthesized by the aforementioned stable free radical moderated polymerization processes wherein each block formed is well defined in length by the sequentially added and reacted monomer and wherein each additional block that is formed also possesses a narrow molecular weight distribution.

In the aforereferenced commonly assigned U.S. Pat. No. 5,312,704, there is disclosed anionic polymerization processes which provide narrow polydispersity homopolymer and copolymer resins, and which resins possesses useful toner image properties, for example in forming gloss and matte images. The useful toner image properties are believed to be a function of the molecular weight properties and the narrow polydispersity properties of the resins. A salient feature of the anionic polymerization process is the relative speed and ease of the polymerization reactions which are typically conducted at lower temperatures to minimize deleterious side reactions. However, a serious disadvantage of such anionic polymerization processes, including cationic polymerization processes, used for the preparation of narrow polydispersity resins, block and multiblock polymers, is that these processes are highly sensitive to and unsuccessful in the presence of aqueous or protic solvent containing polymerization media, or in the presence of protonic or reactive functional groups.

In commonly owned and assigned U.S. Pat. No. 5,322,912 there is disclosed free radical polymerization processes for the preparation of a thermoplastic resin or resins comprising: heating from about 100° to about 160° C. a mixture comprised of a free radical initiator, a stable free radical agent, and at least one polymerizable monomer compound to form the thermoplastic resin or resins with a high monomer to polymer conversion and a narrow polydispersity. A broad spectrum of free radical reactive monomers, including acrylate and acrylic acid derivatives, are suitable for use in the highly versatile polymerization process. The resins produced thereby possess useful toner image properties. In the aforementioned commonly owned and assigned U.S. Pat. No. 5,412,047, there is disclosed a method for forming homopolymeric materials by way of stable free radical moderated polymerizations of monomers which heretofore did not polymerize to any useful extent under stable free radical moderated polymerization conditions, such as disclosed in U.S. Pat. No. 5,322,912. And although copolymers could be easily obtained, a problem remained in that homopolymers of the low reactivity monomers could not be directly obtained.

Notwithstanding the improvements made in monomer chemoselectivity achieved in U.S. Pat. No. 5,412,047, there remained a need for further improvements in monomer reactivity and selectivity and means for achieving stable free radical mediated homopolymerization processes, especially for acrylate, acrylamide, and related monomers.

The present invention enables, in embodiments, the preparation of homopolymers, copolymers, block and multiblock copolymers using stable free radical moderated, free radical initiated polymerization systems which provide enhanced yields and accelerated, albeit thermally controlled, rates of polymerization in a variety of reaction media and in the presence of a variety of monomer and polymer functional groups.

The present invention provides, in embodiments, product resins with a latent, thermally reactive, functional group on at least one end of the polymer chain which can be used for further free radical type addition reactions to prepare other resins with complex architectures. The present invention, in embodiments, provides polymerization processes that enable control of resin molecular weight, molecular weight distribution, modality of the products, and the like properties.

The present invention is directed, in embodiments, to pseudoliving stable free mediated polymerization processes which permit the economic preparation of homopolymeric and copolymeric narrow polydispersity resins with low, intermediate, or high molecular weights. The low molecular weight resins can be prepared without a chain transfer agent or molecular weight modifier which provides several advantages over conventional chain transfer mediated polymerization processes as illustrated herein.

It is known that less reactive or seemingly unreactive unsaturated monomers which do not react under typical free radical homopolymerization conditions, will react to form copolymers in the presence of certain comonomers, for example, maleic anhydride, reference for example, Herman F. Mark et al., editors, *Encyclopedia of Polymer Science*, Vol. 9, pages 225–295, John Wiley and Sons, Inc., 1985, and B. C. Trivedi and B. M. Culbertson, *Maleic Anhydride*, Plenum Press, 1982.

Although not desired to be limited by theory, it is believed that the low free radical reactivity monomers or comonomers of the prior art when used in the present invention may form a charge transfer or related complex with the electron acceptor compound which selectively lowers the polymerization activation energy of the low reactivity monomers or comonomers thereby enhancing their polymerization rate. The influence of complex formation or interaction on the monomer or comonomer reactivity may be sufficiently large that the low reactivity monomers may react more rapidly or preferentially compared to those monomers which do not interact with the electron acceptor compound, for example, those monomers that are conventionally considered as high reactivity monomers under ordinary free radical polymerization conditions.

The following patents are of interest to the background of the present invention, the disclosures of which are incorporated by reference herein in their entirety:

U.S. Pat. No. 4,581,429 to Solomon et al., issued Apr. 8, 1986, discloses a free radical polymerization process which controls the growth of polymer chains to produce short chain or oligomeric homopolymers and copolymers including block and graft copolymers. The process employs an initiator having the formula (in part) =N—O—X, where X is a free radical species capable of polymerizing unsaturated monomers. The molecular weights of the polymer products obtained are generally from about 2,500 to 7,000 having polydispersities generally of about 1.4 to 1.8, at low monomer to polymer conversion. The reactions typically have low conversion rates and use relatively low reaction temperatures of less than about 100° C., and use multiple stages.

Other references relevant to the Solomon et al. patent include: *High Molecular Compounds*, Ser. A, Vol. 17, No. 8, pp 1671–77 (1975); *High Molecular Compounds*, Ser. A, Vol. 20. No. 11, pp. 2448–54 (1978); *Polymer Bulletin*, Vol. 1, pp. 529–534 (1979); *J. Macromol Sci.-Chem.*, A17(1), pp. 45–50 (1982); Macromolecules, Vol. 15, pp. 909–914 (1982); *Tetrahedron Letters*, Vol. 22, pp. 1165–68 (1981); *J. Macromol Sci.-Chem.*, A17(1), pp. 51–59 (1982); *Aust. J. Chem.*, Vol. 36, pp. 397–401 (early 1983); *Markromol Chem. Rapid Commun.*, Vol. 3, p. 533 (1982); *Tetrahedron Letters*, Vol. 23, p. 1309–12 (1982); *Aust. J. Chem.*, Vol. 35, p. 2013–23 (1982); *Polymer Bulletin*, Vol. 6, p. 647–51 (1982); and *Aust. J. Chem.*, Vol. 36, pp. 1573–88 (August 1983). Other relevant references are U.S. Pat. Nos. 3,372,182; 3,639,226; 3,862,097; 3,869,278; 3,902,904; 4,008,175; 4,065,613; 4,067,858; 4,169,115; 4,230,843; 4,358,565; 4,360,643; and Soviet Union Patent No. 478,838.

U.S. Pat. No. 5,059,657 to Druliner et al., issued Oct. 22, 1991, discloses a polymerization process for acrylic and maleimide monomers by contacting the monomers with a diazotate, cyanate or hyponitrite, and N-chlorosuccinimide, N-bromosuccinimide or a diazonium salt. The polymer produced can initiate further polymerization, including use in block copolymer formation.

In *J. Macromol. Sci-Chem.*, A14(1), PP. 33–50 (1980) E. Rizzardo and D. H. Solomon, there is disclosed the acid induced free radical decomposition of hydroperoxides and the polymerization of methyl methacrylate with tert-butyl hydroperoxide and sulfuric acid.

Other references cited in an international search report for the aforementioned U.S. Pat. No. 5,322,912 are: *J. Am. Chem. Soc.*, 1983, 5706–5708; *Macromol.*, 1987, 1473–1488; *Macromol.*, 1991, 6572–6577; U.S. Pat. No. 4,628,019 to Suematsu et al., issued Aug. 10, 1986; U.S. Pat. No. 3,947,078 to Crystal, issued Aug. 10, 1976; and U.S. Pat. No. 3,965,021 to Clemens et al., issued Jun. 22, 1976.

The following references are also of interest: U.S. Pat. Nos. 3,682,875; 3,879,360; 3,954,722; 4,201,848; 4,542,182; 4,581,429; 4,777,230; 5,059,657; 5,173,551; 5,191,008; 5,191,009; 5,194,496; 5,216,096; 5,268,437; 4,546,160; 4,736,004; and 5,247,024.

There remains a need for polymerization processes for the preparation of narrow polydispersity homopolymeric containing resins by economical and scalable stable free radical polymerization techniques and which polymers retain many or all of their desirable physical properties, for example, hardness, low gel content, processibility, clarity, high gloss durability, and the like, while avoiding the problems of gel formation, exotherms, volume limited and multi-stage reaction systems, purification, performance properties of the polymer resin products, and the like, associated with prior free radical polymerization methodologies.

The polymerization processes and thermoplastic resin products of the present invention are useful in many applications, for example, as a variety of specialty applications including toner and liquid immersion development ink resins or ink additives used for electrophotographic imaging processes or where monomodal or mixtures of monomodal narrow molecular weight homopolymeric resins or homopolymeric containing block copolymers with narrow molecular weight distribution within each block component and which polymers are suitable for use, for example, in thermoplastic films, particles, and aqueous, organic, or mixed solvent borne coating technologies.

SUMMARY OF THE INVENTION

An object of the present invention is to provide stable free radical homopolymerization processes, and homopolymers and copolymers therefrom with the advantages indicated herein, other advantages, and that in embodiments, overcome many of the problems and disadvantages of the aforementioned prior art processes.

In another object of the present invention is provided, in embodiments, a polymerization process for the preparation of thermoplastic resin or resins comprising heating a mixture comprised of a free radical initiator, a stable free radical agent, at least one polymerizable monomer compound with low stable free radical polymerization reactivity, and an electron acceptor (EA) compound, to form a thermoplastic resin or resins containing a homopolymeric segment or segments comprised of contiguously polymerized low reactivity monomers, with a high monomer to polymer conversion and a narrow polydispersity.

In another object of the present invention, in embodiments, is provided processes or means for the acceleration of the rate of polymerization of low reactivity monomers and comonomers, and of mixtures of monomers with widely different reactivities under conventional free radical polymerizations or stable free radical moderated free radical polymerization reaction conditions.

In yet another object of the present invention is provided, in embodiments, stable free radical moderated polymerization processes conducted in the presence of rate enhancing electron acceptor compounds wherein the known reactivity ratio of low free radical reactivity monomers in the presence of high free radical reactive monomers, is favorably altered so that the low reactivity monomers can be homopolymerized, and in certain instances, homopolymerized at comparable rates or in preference to high free radical reactive monomers.

In another object of the present invention provides for the addition of minor amounts of one or more electron acceptor compounds to the reaction medium to enable homopolymerization of normally unreactive monomers in the presence of a stable free radical compound, such as a nitroxide, and without broadening the polydispersity of the polymeric resins and without inducing autopolymerization effects.

In another object of the present invention there is provided polymerization processes for the preparation of homopolymeric and copolymeric resins with narrow polydispersities in high conversions.

It is also an object of the present invention to provide polymerization processes for the production of diblock and multiblock polymers containing homopolymeric segments of normally unreactive unsaturated monomers in the presence of a stable free radical compound with high monomer to polymer conversion and a narrow polydispersity.

It is a further object of the present invention to provide polymerization processes which do not require the use of water or organic solvents, or chain transfer agents as a means or method of controlling the molecular weight of the incipient or resulting polymers.

Another object of this invention is to provide polymerization processes which result in polymeric resin products having number average molecular weights above 1,000.

Another object of this invention is to provide polymer mixtures having number average molecular weights above about 1,000 to about 100,000 to 200,000 and a polydispersity from about 1.0 to about 2.0.

Another object of this invention is to provide a polymer or polymer mixtures having sufficiently low polydispersity properties and high monomer conversions such that residual monomer levels are low and are within industrially acceptable levels.

Another object of the present invention is to provide a polymerization reaction system which may be conducted in the presence of a minimum amount, such as from 0 to 5 percent, of conventional reaction media such as water, water soluble and insoluble organic solvents, and mixtures thereof.

In yet another object of the present invention, coupling or disproportionation termination reactions are minimized by reversibly terminating the propagating free radical chains with stable free radical agent which enables and serves to moderate the exothermicity and modality properties of the acrylate polymerization process.

In another object of the present invention is provided a means for the acceleration of the dissociation of the free radical peroxide initiator by the addition of promoter compounds which include, for example, tertiary amines, which ensure that all polymeric chains are initiated nearly simultaneously or at about the same time.

In another object of the present invention provides for the addition of small amounts, such as from about 0.01 to about 5 weight percent, of organic acids, for example, sulfonic or carboxylic acids, to the reaction medium to alter the normal rate of monomer reaction without broadening the polydispersity of the polymeric resins and without inducing autopolymerization effects.

Still another object of the present invention is to prepare thermoplastic resins by single pot processes employing suitable monomer or monomers, free radical initiator, a stable free radical agent, a sulfonic acid salt polymerization rate enhancing compound and optional minimal amounts, such as from about 0.01 to about 5 weight percent, of an emulsifier or surfactant which may provide additional rate enhancement or simplify isolation, but avoids emulsification or phase separation during the polymerization.

Another object of the present invention is to prepare resins using polymerization processes wherein the molecular weight of the growing polymer or copolymer chains increase approximately linearly over the entire time period of the polymerization reaction and wherein the percent conversion or degree of polymerization of monomer to polymer with respect to time or number average molecular weight is approximately linear, that is, polymerization processes which occur without a Trommsdorff effect.

In another object of the present invention there is provided a process which enables further narrowing of the polydispersity of the thermoplastic resin produced and this is accomplished by including an electron donor compound in the heated reaction mixture.

Still another object of the present invention is to provide polymerization processes, such as from about 1.0 to about 2.0, for the preparation of resins with narrow polydispersity properties and which polymerization processes are accomplished in a time efficient and economic manner by the addition of electron acceptor compounds and optional addition of dialkyl sulfoxides, such as dimethyl sulfoxide (DMSO), which polymerization rate enhancing compounds and promoter compounds, respectively, result in enhanced rates of homopolymerization and greater narrowing of the polymer product polydispersity. The dialkyl sulfoxide additives are preferably liquid at the polymerization reaction temperature and may be used in amounts for about several tenths of a weight percent of the total reaction mixture, to use in amounts as the exclusive reaction solvent or reaction media.

Other objects of this invention will be apparent to those skilled in the art especially in view of the present disclosure and appended claims.

DETAILED DESCRIPTION OF THE INVENTION

Figure 1:
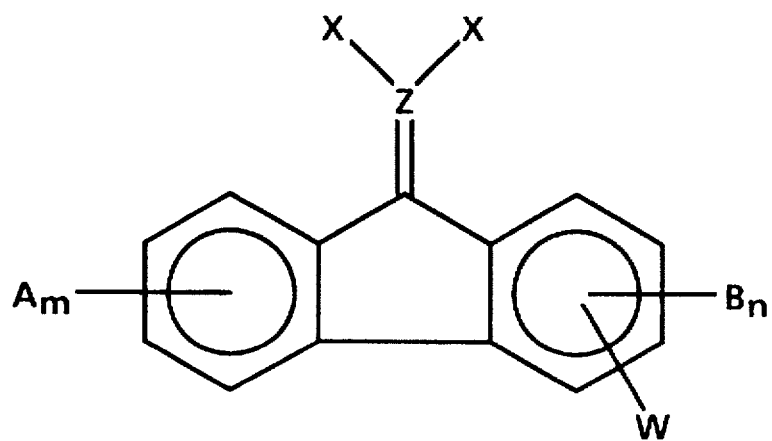
FIG. 1 illustrates in embodiments, an exemplary class of electron acceptor compounds useful in embodiments of the present invention.

A solution to the problem of homopolymerization of unreactive or low reactivity monomers, for example, alkyl acrylates and alkyl substituted acrylamides in the presence of a stable free radical compound was achieved by adding, for example, an electron acceptor compound, such as those compounds shown in the Figures. Surprisingly and unexpectedly when an electron acceptor compound was added, for example, to the stable free radical polymerization reaction mixture, it was found that certain heretofore unreactive or very low reactivity unsaturated monomers could be effectively and efficiently homopolymerized.

Another surprising discovery was that the rate of polymerization of reactive monomers, such as styrene was also enhanced to a greater or lesser extent than the low reactivity monomers depending upon the relative molar ratios of stable free radical agent to initiator, and stable free radical to electron acceptor compound. Furthermore, when for example, an organic soluble electron acceptor compound is selected, there are provided convenient and efficient stable free radical mediated emulsion polymerization processes wherein the rate enhancing electron acceptor compound remains contained in the discrete or dispersed organic phase where substantially all the desired polymerization occurs thereby maximizing the rate enhancing effect and monomer reactivity activation effect provided by the electron acceptor compound.

The present invention provides, in embodiments, improved polymerization processes for preparing polymeric resins with well defined molecular weight properties and narrow polydispersities. The processes can be operated as batch, semi-continuous or continuous processes. The processes provide for from about 5 to about 99 percent by weight of the reaction mixture to be monomer or monomer mixtures and, wherein for example, the processes are conducted at temperatures from about 100° C. to about 180° C., and in embodiments, preferably from about 70° C. to about 160° C. The processes produce polymer products having low, intermediate, or high molecular weight such as from about 1,000 to 100,000 weight average molecular weight, narrow polydispersity, and relatively low or no residual salt content, reference the aforementioned copending U.S. Ser. No. 08/413,663.

In embodiments, the present invention overcomes the problems and disadvantages of the prior polymerization processes by forming narrow polydispersity polymeric resins with particular homopolymeric segments therein by means of, for example, heating for a time, a mixture comprised of a free radical initiator, a stable free radical agent, at least one polymerizable monomer compound, for example, an acrylate or an acrylamide, and a minor amount of an electron acceptor compound.

In embodiments, the present invention provides a polymerization process for the preparation of thermoplastic resin or resins comprising heating from about 100° to about 180° C. for a time period of about 30 minutes to about 10 hours, a mixture comprised of a free radical initiator, an nitroxyl or non-nitroxyl stable free radical agent, at least one polymerizable monomer compound and more specifically from 1 monomer to about 10 monomers, and more specifically, from 1 monomer to about 10 monomers, and an electron acceptor compound to form, for example, an acrylate type homopolymer containing thermoplastic resin; cooling the mixture; and optionally isolating, washing, and drying the resulting thermoplastic resin, wherein the thermoplastic resin possesses a narrow polydispersity of from about 1.0 to about 2.0, and preferably from about 1.0 to about 1.5, a modality of 1, and wherein a monomer to polymer conversion of from about 10 to about 100 percent is achieved.

The foregoing process can, in embodiments, be expanded to enable the formation of bimodal or multimodal thermoplastic resins by for example, the processes as disclosed in the aforementioned commonly owned and assigned U.S. Pat. Nos. 5,322,912, and 5,401,804, the disclosures of which are incorporated herein by reference in their entirety. The resulting resins in the foregoing process, in embodiments can be, for example, a bimodal mixture of a first product resin comprising a diblock copolymer comprised of a first segment containing a block derived from a first monomer and a second block arising from the second monomer mixture, and a second product resin comprised of a homopolymer derived from substantially only the second monomer mixture.

In other embodiments of the present invention, there are provided improved polymerization processes for the preparation of diblock and multiblock thermoplastic resins, as disclosed in the aforementioned commonly owned and assigned U.S. Pat. Nos. 5,322,912, and 5,401,804, the disclosures of which are incorporated herein by reference in their entirety, by adding a sulfonic acid salt compound to the polymerization reaction mixture. Added monomers can be water soluble, water insoluble, or of intermediate water solubility. Judicious selection of the water solubility properties of added monomers and the resulting polymeric segment(s) enables convenient synthetic routes to block and multiblock copolymers with narrow polydispersities that are useful, for example, as surfactants and emulsifiers.

In another embodiment of the present invention, there is provided a process or process modification which enables even narrower polydispersity thermoplastic resin products to be obtained. Further narrowing of the polydispersity of the thermoplastic resins produced is achieved by including an electron donor compound in the heated reaction mixture. Thus, when an electron donor compound is added to the initial heated reaction mixture of the present invention in molar amounts which are less than the electron acceptor compound, thermoplastic resins are obtained with narrower polydispersities, for example, from about 1.1 to about 1.4, and which polydispersities are narrowed by about 10 to about 50 percent relative to a stable free radical polymerization conducted with an electron acceptor present but in the absence of an electron donor compound. Suitable electron donor compounds for use in the present invention include known electron donor compounds including fulvalene compounds, tetrathiafulvalene compounds, arylamino compounds, alkylamino compounds, hydroxyaryl compounds, hydroxyalkyl compounds, and the like compounds, and mixtures thereof. The electron donor (ED) compounds when selected, are used in molar amounts which are equal to, or preferably less than, the electron acceptor (EA) compound selected, for example, in molar ratios (ED:EA) from about 1:1 to about 0.1:1.0. In a preferred embodiment, the molar ratio of the electron donor to electron acceptor compound is about 0.33:1.0. Other electron transport compounds suitable for use in the present invention are disclosed, for example, in U.S. Pat. No. 4,939,061 and references therein.

In yet other embodiments of the present invention, there are provided processes for polymerizing monomers comprising: (a) forming a reaction mixture by feeding into a reactor containing water or solutions of water miscible cosolvent; (i) one or more free radical polymerizable monomers in solution or suspension; (ii) a nitroxide stable free radical or other suitable known stable free radical compounds, or a solution thereof in admixture with an effective amount of a electron acceptor compound; and (iii) a free radical initiator, or a solution thereof, in an effective amount for initiating polymerization of the monomers; and (b) heating the reaction mixture from about 100° C. to about 180° C. to form in a time efficient manner a homopolymeric or copolymeric resin with a narrow polydispersity and high conversion. This process embodiment can be accomplished by adding one or more monomers, a free radical initiator, an electron acceptor compound and the stable free radical compound simultaneously or sequentially in the order (i), followed by (ii), and then (iii).

Monomers suitable for use in the present invention include known monomers, such as $C_3$–$C_6$ monoethylenically unsaturated monocarboxylic acids, and the alkali metal and ammonium salts thereof. The $C_3$–$C_6$ monoethylenically unsaturated monocarboxylic acids include acrylic acid, methacrylic acid, crotonic acid, vinylacetic acid, acryloxypropionic acid, and the like monomers.

Other carboxylic acid monomers suitable for the present invention include $C_4$–$C_6$ monoethylenically unsaturated dicarboxylic acids and the alkali metal and ammonium salts thereof, and the anhydrides of the cis dicarboxylic acids. Suitable examples include maleic acid, maleic anhydride, itaconic acid, mesaconic acid, fumaric acid, and citraconic acid.

Suitable bases useful for neutralizing the monomer acids include sodium hydroxide, ammonium hydroxide, potassium hydroxide, and the like. The acid monomers may be neutralized to a level of from 0 to about 50 percent by weight, and preferably from 0 to about 20 percent. More preferably, the carboxylic acid monomers are used in the completely neutralized form. Partial neutralization of the carboxylic acid monomers minimizes or eliminates corrosion on parts of the reactor equipment, but conversion of the monomers into polymer product may be diminished. The acidic or labile proton containing monomers may be neutralized prior to, during, or after polymerization. The polymer products are often particularly useful in their partially or completely neutralized form.

Examples of other polymerizable monomers may be monoethylenically unsaturated carboxylic acid-free monomers. Suitable monoethylenically unsaturated carboxylic acid-free monomers must be copolymerizable with the carboxylic acid and ester monomers. Preferred monoethylenically unsaturated carboxylic acid-free monomers which are suitable in the present invention include alkyl esters of acrylic or methacrylic acids such as methyl acrylate, ethyl acrylate, butyl acrylate; hydroxyalkyl esters of acrylic or methacrylic acids such as hydroxyethyl acrylate, hydroxypropyl acrylate, hydroxyethyl methacrylate, and hydroxypropyl methacrylate; acrylamide, methacrylamide, N-tertiary butylacrylamide, N-methylacrylamide, N,N-dimethylacrylamide; acrylonitrile, methacrylonitrile, dimethylaminoethyl acrylate, dimethylaminoethyl methacrylate, phosphoethyl methacrylate, N-vinylpyrrolidone, N-vinylformamide, N-vinylimidazole, vinyl acetate, styrene, hydroxylated styrenes, styrenesulfonic acid and salts thereof, vinylsulfonic acid and salts thereof, and 2-acrylamido-2-methylpropanesulfonic acid and salts thereof.

Other suitable comonomers include acrylamides, alkyl and aryl amide derivatives thereof, and quaternized alkyl and aryl acrylamide derivatives, for example, acrylamide, methacrylamide, N-tertiary butylacrylamide, N-methylacrylamide, and N,N-dimethylacrylamide. Still other suitable monomers include acrylonitrile, methacrylonitrile, phosphoethyl methacrylate, N-vinylpyrrolidone, N-vinylformamide, N-vinylimidazole, vinyl acetate, styrene, hydroxylated styrenes, strenesulfonic acid and salts thereof, vinylsulfonic acid and salts thereof.

The monomers and comonomers that can be used in the present invention are any monomer capable of undergoing a free radical polymerization and include but are not limited to styrene, substituted styrenes and derivatives thereof, for example, hydroxylated, sulfonated, and methylated styrenes, acrylates, butadiene, and any conjugated diene monomer sufficiently reactive under the specified stable free radical moderated polymerization reaction conditions to afford a stable free radical reaction adduct and subsequently high molecular weight polymer products, for example, polymers or copolymers of styrene, alkyl acrylates with esters having from 1 to 20 carbon atoms such as n-butyl acrylate, acrylic acid, acrylamides with nitrogen substituents having from 0 to 20 carbon atoms such as N,N-dimethyl acrylamide, mixtures thereof, and the like. Examples of specific polymers generated with the processes of the present invention include, for example, poly(n-butyl acrylate); poly (acrylamide); and poly(n-butyl acrylate-b-acrylamide).

Monomers, polymers and copolymers of the present invention can, in embodiments where acidic or basic functional groups reside in the polymer product, be separated from one another or from the polymerization reaction mixture by, for example, changing the pH of the reaction media and other well known conventional separation techniques.

Suitable initiators for the processes of the present invention are any conventional free radical initiators which have a half-life of at least 1 second at the polymerization temperature. Preferably, the initiator will have a half life of from about 10 second to about 2 hours, more preferably from about 10 seconds to about 10 minutes at the reaction temperature. These initiators include, but are not limited to oxygen, hydrogen peroxide, certain alkyl hydroperoxides, dialkyl peroxides, peracids, peresters, percarbonates, peroxides, persulfates, and azo initiators. Specific examples of some suitable initiators include hydrogen peroxide, t-butyl hydroperoxide, di-tertiary butyl peroxide, tertiary-amyl hydroperoxide, potassium persulfate, and methylethyl ketone peroxide. The initiators are normally used in amounts of from about 0.05 percent to about 33 percent based on the weight of total polymerizable monomer. A preferred range is from about 0.5 to about 20 percent by weight of the total polymerizable monomer.

Redox initiators may also be used in the processes of the present invention. These initiators include, but are not limited to, sodium bisulfite, sodium sulfite, isoascorbic acid, sodium formaldehyde-sulfoxylate, and the like, used with suitable oxidizing agents, such as the thermal initiators noted above. When selected, the redox initiators may be used in amounts of 0.05 percent to 16 percent, based on the total weight of monomer. A preferred range is from about 0.5 to about 5 percent by weight of total monomer. Since many of these initiators introduce salt by-products into the aqueous polymer product, it is preferred that the level of these initiators, if used, be minimized, for example, to less than 1.0 percent.

The stable free radical compound selected for the processes of the present invention may be any known stable free radical agent which, for example, enables many of the objects of the present invention to be achieved. The aforementioned copending applications and commonly assigned patents disclose various stable free radical agents. Examples of stable free radical compounds which are suitable for use in moderating the polymerization of free radical reactive monomers include: 2,2,6,6-tetramethy-1-piperidinyloxy free radical (TEMPO); 4-hydroxy-2,2,6,6-tetramethy-1-piperidinyloxy free radical; 2,2,5,5-tetramethyl-1-pyrrolidinlyoxy; 3-carboxy-2,2,5,5-tetramethyl-1-pyrrolidinyloxy; and di-tert-butyl nitroxide. Other suitable stable free radical compounds include the non-nitroxyl stable free radical compounds disclosed in the aforementioned copending U.S. Ser. No. 08/345,371. A preferred nitroxyl stable free radical compound is 2,2,6,6-tetramethy-1-piperidinyloxy free radical (TEMPO), and the corresponding 4-oxo derivative.

Hydrophilic stable free radical compounds which may be selected and are known, include, for example, U.S. Pat. No. 5,264,204, discloses a magnetic resonance organ and tissue imaging method using these compounds, and a number of other suitable stable free radical compounds are available commercially and are readily accessible synthetically, for example, as disclosed in "Synthetic Chemistry of Stable Nitroxides", by L. B. Volodarsky et al., CRC Press, 1993, ISBN:0-8493-4590-1, the disclosures of which are incorporated by reference herein in their entirety.

The electron acceptor compound can be any electron acceptor compound that, for example, accomplishes many of the objectives of the present invention. Examples of suitable electron acceptor compounds include: quinodimethane compounds, anthraquinodimethane compounds, fluorenylidene compounds, ferrocene compounds, nitroarene compounds, cyanoarene compounds, aromatic compounds with from 6 to 24 carbon atoms and having electron withdrawing substituents selected from the group consisting of cyano and nitro, and mixtures thereof. Other suitable electron acceptor compounds include tetracyanoquinodimethane (TCNQ), 7,7-dicyanoquinomethane, nitro-9-fluorenone compounds, nitro-9-fluorenylidene compounds, nitroarene compounds, and the like compounds.

The electron acceptor rate accelerating compound is preferably readily soluble in a wide variety of organic solvents and easily blended into organic soluble monomers and or polymers. A preferred electron acceptor compound class employed in the present invention is illustrated in FIG. 1 wherein X is cyano, alkoxycarbonyl groups, or electron pairs associated with an oxo type oxygen atom substituent; Z is a carbon atom or an oxygen atom; A and B are electron withdrawing groups including cyano and nitro substituents, m is a number of from 0 to 2, n is the number 0 to 1, W is an electron withdrawing group selected from the groups consisting of acyl (COR), alkoxycarbonyl (COOR), alkylaminocarbonyl (CONHR), and derivatives thereof, and R is selected from an alkyl group having from 1 to 20 carbon atoms or substituted derivatives thereof.

Figure 2:
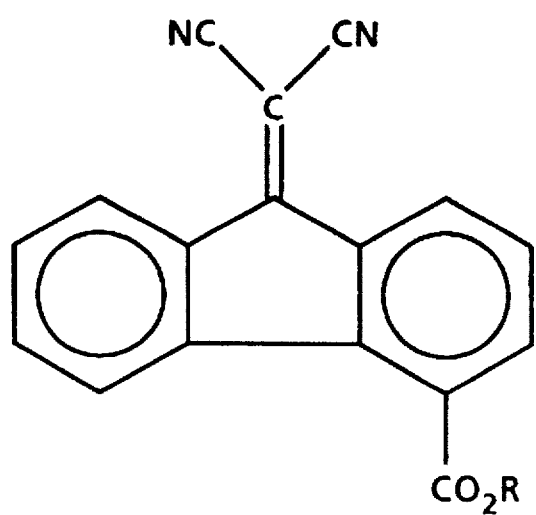
FIG. 2 illustrates, in embodiments, an exemplary member of the class of electron acceptors of FIG. 1 which are useful in embodiments of the present invention.

The electron acceptor compound can be, in embodiments, represented by the formula as shown in FIG. 2, wherein R is an alkyl group with from 1 to 20 carbon atoms, and arylalkyl group with from 7 to 20 carbon atoms, an aryl group with from 6 to 20 carbon atoms, oxygen, sulfur, phosphorous or halogen substituted derivative thereof. A preferred electron acceptor compound class is represented in FIG. 2. A particularly preferred electron acceptor compound of the class useful, in embodiments, in the present invention, is 4-butyloxy carbonyl-9-fluorenylidenemalononitrile, wherein R is an n-butyl group.

Figure 3:
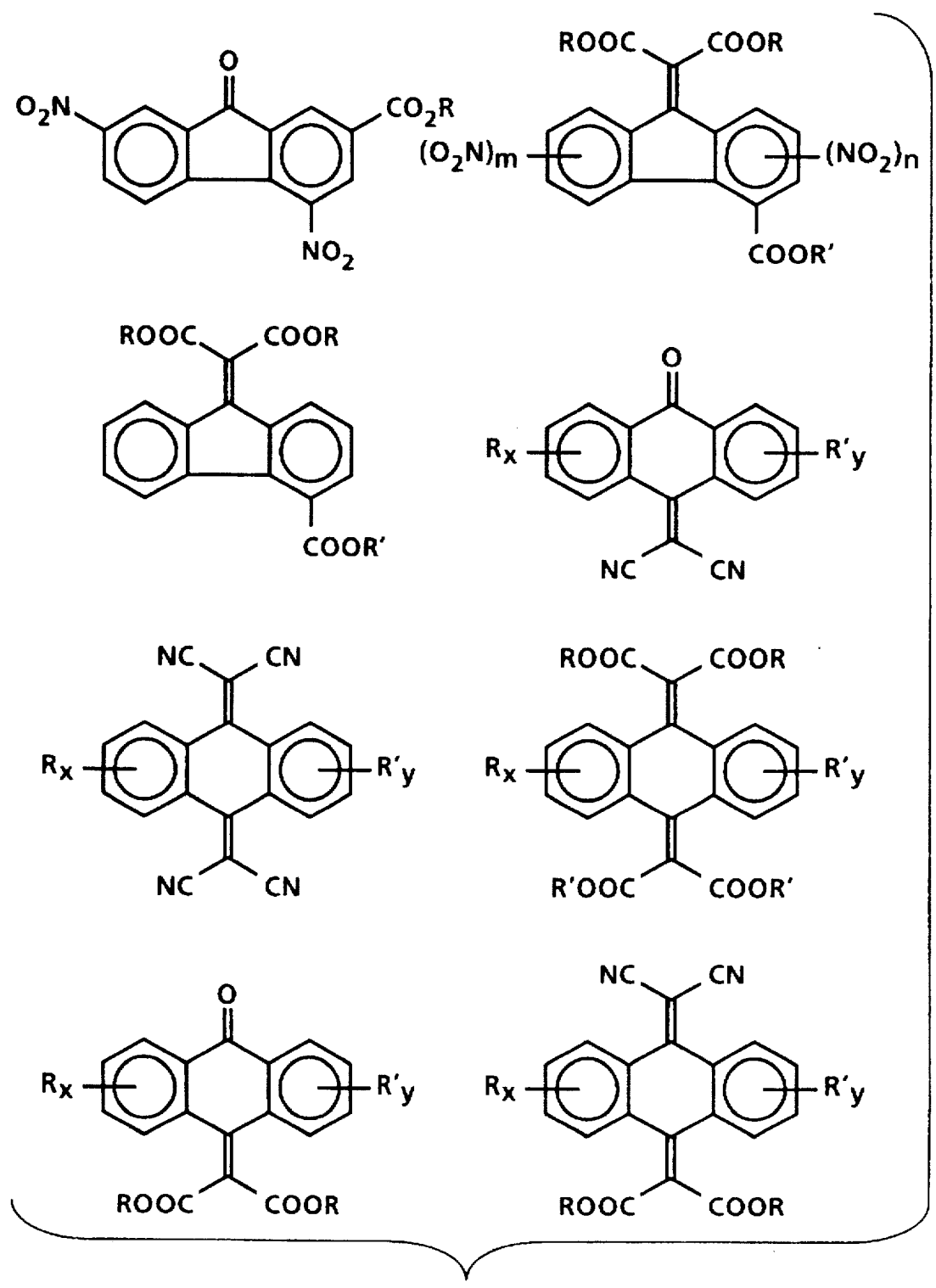
FIG. 3 illustrates, in embodiments, other exemplary electron acceptor compounds useful in embodiments of the present invention.

Other examples of electron acceptor organic compounds include those shown in FIG. 3 wherein R and R' are independently selected from an alkyl group having from 1 to 20 carbon atoms or substituted derivative thereof; x and y are whole number integers ranging from 1 to about 4; m and n are whole number integers ranging from 0 to about 4.

Still other suitable electron acceptor compounds are disclosed in commonly owned and assigned U.S. Pat. No. 4,474,865, the disclosure of which is incorporated herein by reference in its entirety.

The electron acceptor compounds, in embodiment, can be used in stable free radical moderated polymerization processes of the present invention in amounts of from about 0.01 to about 20 weight percent based on the weight of the total monomer used. The electron acceptor compound can be used in amounts of about 0.5 to about 10.0 molar equivalents relative to the free radical initiator compound, and in amounts of about 0.5 to about 5.0 molar equivalents relative to the stable free radical compound. In embodiments, a preferred ratio of stable free radical agent to electron acceptor (SFR:EA) is 1.3:2.0.

Although not wanting to be limited by theory, it is believed that the relative ratios of the stable free radical agent and free radical initiator, and the stable free radical agent and the electron acceptor strongly influence the absolute and relative reactivity rates of the monomers selected for polymerization. The inclusion of small amounts of an acid, such as benzoic acid, into the polymerization reaction mixture is believed to enhance the rate of polymerization and the extent of reaction or conversion of monomers per unit time in the presence of the electron acceptor compound. Thus, it appears that there may be some subtle interactions between the reaction components and additives which result in some rather dramatic and useful differences in the relative rate of polymerization and relative reactivity of monomers.

The monomers of the present invention can be polymerized in a variety of polymerization reaction media. The reaction mixture may contain from about 95 to about 98 percent by weight, preferably from about 20 to about 90 percent by weight, and most preferably from 25 to about 85 percent by weight monomer with the balance comprised of other reactants, reagents, comonomers, and optional additives, solvents, or diluents.

The polymerization reactions of the present invention can be supplemented with a solvent or cosolvent to help ensure that the reaction mixture remains a homogeneous, single phase throughout the monomer conversion. Any solvent or cosolvent may be selected providing that the solvent media is effective in providing a solvent system which avoids undesired precipitation or phase separation of the reactants or polymer products until after all polymerization reactions have been completed. Exemplary solvent or cosolvents useful in the present invention may be selected from the group consisting of polymer product compatible aliphatic alcohols, glycols, ethers, glycol ethers, pyrrolidines, N-alkyl pyrrolidinones, N-alkyl pyrrolidones, polyethylene glycols, polypropylene glycols, amides, carboxylic acids and salts thereof, esters, organosulfides, sulfoxides, sulfones, alcohol derivatives, hydroxyether derivatives such as butyl CARBITOL® or CELLOSOLVE®, amino alcohols, ketones, water, and the like, derivatives thereof, and mixtures thereof. Specific examples include ethylene glycol, propylene glycol, diethylene glycol, glycerine, dipropylene glycol, tetrahydrofuran, and the like, and mixtures thereof. When mixtures of water and water soluble or miscible organic liquids are selected as the reaction media, the water to cosolvent weight ratio typically ranges from about 100:0 to about 10:90, and preferably from about 97:3 to about 25:75.

Heating is accomplished at various effective temperatures and more specifically, temperature of the polymerization may range from about 100° C. to about 180° C., and preferably from about 110° C. to about 175° C. At temperatures below about 60° to about 100° C., the reaction rate is slower and industrially impractical without a rate enhancing compound, alone or in admixture with an acid or base accelerating additive compound. At temperatures above about 180° C., conversion of the monomer into polymer decreases and uncertain and undesirable by-products may be formed. Frequently, these by-products discolor the polymer mixture and may necessitate a purification step to remove them or they may be intractable.

Since solvent and cosolvent admixtures can be used as the reaction media, the elevated temperatures of the polymerization require that the polymerization reactor be equipped to operate at elevated pressure. In general, it is preferred to conduct the polymerization at, for example, from about 10 to about 2,000 pounds per square inch (psi), and more preferably at from about 50 to about 1,000 psi, however, other effective pressures may be selected.

The molecular weights referred to are measured by gel permeation chromatography using, for example, a polyethylene oxide standards for water soluble polymers and polystyrene standards for organic soluble polymers unless specifically stated otherwise, and thermal gravimetric analysis (TGA) was used for measuring conversions.

Although not being desired to be limited by theory, it is believed that when polymerization reaction processes of the present invention are performed in the presence of an electron acceptor compound, the electron acceptor compound interacts with the normally low reactivity or unreactive monomer(s) to form a transient complex, and which interaction and complexation lowers the activation energy of the monomer(s) with respect to free radical polymerization reaction intermediates thereby facilitating the formation of polymer products from the less reactive acrylate and acrylamide type monomers. Further, the aforementioned interaction and complexation may be responsible for enabling the polymerization reactions of the present invention to be accomplished at lower temperatures. Thus, in embodiments, depending upon the choice of reactants and electron acceptor, the polymerization reaction temperatures may be lowered by from about 5° to about 50° C. while maintaining high rates of conversion and narrow polydispersities.

Although not wanting to be limited by theory, it appears that the electron acceptor compound is interacting with the molecular orbitals of the low reactivity monomer compounds thereby functioning as a catalyst in the polymerization reactions since the electron acceptor facilitates the formation of homopolymeric products from heretofore low reactivity or unreactive monomers, such as alkyl acrylate esters and acrylamides, without being consumed or incorporated into the product polymer to any measurable extent. The electron acceptor compound assisted polymerization reactions may be accomplished at lower temperatures or in less time than in the absence of the electron acceptor compound. An alternative, but less likely, mechanistic scenario invokes the interaction of the electron acceptor compound with the stable free radical compound.

Propagating chains of the present invention are referred to as pseudoliving because the stable free radical agent adds to a propagating chain and the chain is temporarily, but reversibly, terminated, reference the aforementioned U.S. Pat. No. 5,322,912, the disclosure of which is incorporated by reference herein in its entirety. The term "protected" as used therein refers, for example, to the availability of oligomeric or polymeric chain radical species for selective rather than indiscriminant further reaction with monomer. An unmoderated free radical polymerization chain, that is, a free radical polymerization process without a stable free radical agent present, in contrast, has a reactive or "open" chain end throughout its lifetime which is typically irreversibly terminated on the order of seconds.

The present invention provides several specific advantages in embodiments as follows.

With the process of the present invention, polymer product polydispersities can be varied from between approximately 1.0 to approximately 2.0, or higher, such as from 2.0 to 10.0, if desired, depending on the monomer/comonomer system by varying the ratio of stable free radical agent to free radical initiator molar concentration. When the polymerization process conditions of the present invention are attempted without a stable free radical (SFR) additive present, considerably broader molecular weight resins, such as from 2.5 to 15.0, are obtained. When the polymerization process of the present invention is attempted in the absence of a suitable electron acceptor compound, little or no product polymer is formed.

The stable free radical agent moderated polymerization reactions of the present invention can be performed in a variety of reaction media such as bulk, solution, including supercritical fluids, aqueous or organic emulsion, suspension, phase transfer, or reactive extrusion.

During the reaction of monomer or mixtures of monomers to form polymers, the reaction time may be varied over about 1 to 60 hours, preferably between about 2 to 10 hours and optimally about 3 to 7 hours, however, other effective times may be selected. The optimal reaction time may vary depending upon the temperature, the volume and scale of the reaction, and the quantity and type of polymerization initiator, the sulfonic acid salt compound, other additives, and stable free radical agent selected.

The polymerization reaction temperature, in embodiments, is preferably kept relatively constant throughout the heating step by providing an adjustable external heat source and which temperature is from about 60° C. to about 180° C., and preferably between 100° C. and 160° C., and optimally in embodiments about 120° C. to about 160° C. Reactions performed above 200° C. tend to result in a broadening of the polydispersity. A reaction volume may be selected for any size that enables simple adding, mixing, reacting and isolating the product resins on an economic or convenient scale.

The free radical initiator can be any free radical polymerization initiator capable of initiating a free radical polymerization process of unsaturated monomers and includes peroxide initiators such as benzoyl peroxide, persulfate initiators such as potassium persulfate, azo initiators such as azobisisobutyronitrile, and the like. The initiator concentration employed is about 0.2 to about 16.0 weight percent of the total weight of monomer to be polymerized and is determined by the desired molecular weight of the resin. As the initiator concentration is decreased relative to the weight or molar equivalents of monomer used, the molecular weight or the thermoplastic resin product increases.

Water soluble free radical initiators can be optionally employed in the processes of the present invention and are those that are traditionally used in aqueous polymerization. Examples of water soluble free radical initiators are: persulfates; water soluble peroxides and hydroperoxides; more specifically, sodium, potassium and ammonium persulfate; peroxides such as hydrogen peroxide, t-butyl hydroperoxide, cumene hydroperoxide, para-menthane hydroperoxide; and peroxy carbonates. Other water soluble free radical initiators of similar decomposition mechanism may be used if desired.

A preferred initiator is one which has a one-hour half-life at about 60° to 95° C. and a ten-hour half-life at about 50° to 80° C. Other peroxides, such as peresters and peracids having somewhat higher one-hour half-life/temperature relationships, may also be used if they are accompanied by a promoter compound such as tertiary amine. Such initiators are, for example: 2,4-dimethyl-2,5-dibenzyl peroxyhexane (138° C.), tert-butyl peroxybenzoate (125° C.), and the like. Still other initiators may also be employed if accompanied by an aforementioned promoter compound in versions of this process, for example, 2,4-pentanedione peroxide (167° C.), di-t-butyl peroxide (149° C.), 2,5-dimethyl-2,5-di(t-butylperoxy)-hexyne (149° C.), and the like. The figures in parentheses are the 1 hour half-life temperatures. Particularly preferred free radical initiators are azobisalkylnitrile and diaroyl peroxide compounds.

The monomer or monomers to be polymerized can, in embodiments, be dissolved in water or aqueous mixtures of polar protic or aprotic organic solvents. The resultant aqueous solution usually contains a suitable water-soluble, free-radical generating initiator such as a peroxide or a persulfate, and the like, as defined above. The monomer or monomers are used in effective amounts relative to the free radical initiator, and stable free radical agent, as defined hereinafter.

The stable free radical agent used for controlled polymerization of monomers or comonomers can be any stable free radical and includes nitroxide free radicals, for example, PROXYL (2,2 5,5-tetramethyl-1-pyrrolidinyloxy) compounds, DOXYL (4,4-dimethyl-3-oxazolinyloxy) compounds, and TEMPO (2,2,6,6-tetramethyl-1-piperidinyloxy) compounds, and the like compounds. These stable free radical agent materials are well known in the literature, see for example G. Moad et.al., *Tetrahedron Letters*, 22, 1165 (1981), as free radical polymerization inhibitors. Other suitable nitroxides used for polymerizing monomers or comonomers are di-tert-butyl nitroxide and related di-tertiary alkyl substituted nitroxides. Under the polymerization conditions of the present invention, the stable free radical agents function not as inhibitors but as moderators to harness the normally highly reactive and indiscriminate propagating intermediate free radical polymer chain species. The stable free radical agents are preferably soluble in the monomer phase, if more than a single phase is present, where predominantly all the polymerization of monomers occurs. Stable free radical agents which have limited monomer solubility are still useful, but may require a monomer miscible cosolvent or else these stable free radical compounds tend to result in less predictable polymerization processes. If the stable free radical agent separates out of the monomer phase to any great extent then the balance desired between the mole ratio of the stable free radical agent, free radical initiator, and propagating free radical polymer chain species may be upset and could lead to polymer products with broadened polydispersities.

The molar ratio of the stable free radical (SFR) agent to free radical initiator (INIT) residing in the monomer phase is from about 0.5 to 5.0, and preferably in the range from about 0.4 to about 4.0. Although not wanting to be limited by theory, in an embodiment, the molar ratio [SFR:INIT.] of stable free radical agent, for example, TEMPO, to free radical initiator, for example, AIBN, is about 2.0 and is believed to be important for success of the process. If the [SFR:INIT.] is too high then the reaction rate is noticeably inhibited. If the [SFR:INIT.] is too low then the reaction product has undesired increased polydispersity.

In embodiments, the molar ratio of monomer content to stable free radical agent to free radical initiator is from about 6.0:0.2:1 to about 10.000:2.5:1 and preferably in the range of about 125:2.0:1 to about 7,000:1.3:1.

Processes of the present invention, in embodiments, provide for selective low, intermediate, and high monomer to polymer conversion rates, or degrees of polymerization, from about 30 to 50 percent by weight, and preferably, for example, of about 50 to 90 percent by weight or greater.

The low weight average molecular weight resin products having narrow polydispersity properties, as is also the situation with intermediate and high molecular weight products of the present invention, may be obtained without the use of a chain transfer agent.

Processes of the present invention, in embodiments, provide for relatively high weight average molecular weights, from weight average molecular weights ranging in size of from low of about 2,000 to high of about 100,000 while delivering narrow polydispersity products. Other molecular weights attainable are in the range of from about 5,000 to about 50,000.

The polymerization reaction rate of the monomers may, in embodiments, be inhibited or accelerated and the reaction time influenced by the addition of a minor amount of a protic acid selected from the group consisting of inorganic acids, such as sulfuric, hydrochloric, and the like, and organic sulfonic and carboxylic acids. Although no definitive trend is presently evident, the added acid may have a profound or very little effect on the polymerization rate, depending upon a variety of reaction variables and conditions. Excessive addition of inorganic and organic acid beyond equimolar amounts compared to the stable free radical agent causes the resin polydispersity to broaden. In embodiments, the protic acid source may be in the form of an effective acid functional group contained in either the stable free radical agent or in the free radical initiator compound.

By cooling the polymerization reaction to below about 50° C., the stable free radical moderated polymerization process is effectively quenched or terminated. Each new or subsequent addition of mixtures containing monomer, stable free radical, and optionally an electron acceptor compound, and initiator, accompanied by heating provides a new polymeric species having a narrow molecular weight distribution and each new polymer species continues to grow along with, but independently of the other stable free radical terminated polymer species already established thereby providing the capability of forming well defined, narrow polydispersity, bimodal and multimodal polymer mixtures.

Alternatively, block copolymer resins may also be prepared whereby after each desired block has been formed, a new monomer or monomers is added, without the addition of more initiator or stable free radical agent, to form a new block wherein each block component is well defined in length and has a narrow molecular weight distribution and having properties depending on the repeated sequence and the monomers chosen for incorporation. Monomers added subsequent to the formation of the first formed polymer or thermoplastic resin may be water soluble or water insoluble. Judicious selection of the water solubility properties of added monomers and the resulting polymeric segment enables convenient synthetic routes to block and multiblock copolymers with narrow polydispersities that are useful, for example, as HLB surfactants, resin compatibilizers, viscosity modifies, and emulsifiers.

The polymeric products of the present invention may be optionally crosslinked with, for example, known crosslinking, coupling, or curing agents such as divinyl benzene and the like, either in situ or in a separate post polymerization process step.

Additional optional known additives may be used in the polymerization reactions which do not interfere with the objects of the invention and which may provide additional performance enhancements to the resulting product resin, for example, colorants, lubricants, release or transfer agents, surfactants, stabilizers, antifoams, antioxidants, and the like.

Polymer resins possessing a discrete mixture of monomodal, that is, a well defined multimodal molecular weight distribution may in embodiments thereof provide several advantages, particularly for electrophotographic toner compositions such as: melt rheology properties including improved flow and elasticity; and improved performance properties such as triboelectrification, admix rates, and shelf life stabilities.

In the aforementioned U.S. Pat. No. 5,322,912, there is disclosed a monomer polymerized in bulk or in the absence of a solvent or diluent, that is neat, using a mixture of styrene monomer, a free radical initiator, and a stable free radical agent at constant temperature. A plot of weight percent monomer conversion versus number average molecular weight indicates that a nearly linear relationship holds for bulk, solution, or heterogeneous polymerization reaction media using stable free radical agent moderated processes and which relationship is believed to be operative in the present invention. Thus, the Trommsdorff effect, that is, known exothermic heating or autoacceleration of the monomer conversion reaction rate and randomization of molecular weights observed in unmoderated free radical polymerization reactions is effectively suppressed in aqueous or nonaqueous polymerization processes of the present invention even at high solids content, high conversion, and elevated temperature free radical initiated polymerization reactions.

Toner compositions can be prepared by a number of known methods, such as admixing and heating the thermoplastic resin obtained with the processes of the present invention such as a styrene-butadiene copolymer or styrene-butyl acrylate copolymer or related derivatives as illustrated below, pigment particles such as magnetite, carbon black, or mixtures thereof, and cyan, yellow, magenta, green, brown, red, or mixtures thereof, and preferably from about 0.5 percent to about 5 percent of charge enhancing additives in a toner extrusion device, such as the ZSK53 available from Werner Pfleiderer, and removing the formed toner composition from the device. Subsequent to cooling, the toner composition is subjected to grinding utilizing, for example, a Sturtevant micronizer for the purpose of achieving toner particles with a volume median diameter of less than about 25 microns, and preferably of from about 6 to about 12 microns, which diameters are determined by a Coulter Counter. Subsequently, the toner compositions can be classified utilizing, for example, a Donaldson Model B classifier for the purpose of removing toner fines, that is toner particles less than about 4 microns volume median diameter.

Illustrative examples of suitable toner resins selected for the toner and developer compositions include polyamides, styrene acrylates, styrene methacrylates, styrene butadienes, vinyl resins, including homopolymers and copolymers of two or more vinyl monomers; vinyl monomers include styrene, p-chlorostyrene, butadiene, isoprene, and myrcene; vinyl esters like esters of monocarboxylic acids including methyl acrylate, ethyl acrylate, n-butyl acrylate, isobutyl acrylate, dodecyl acrylate, n-octyl acrylate, phenyl acrylate, methyl methacrylate, ethyl methacrylate, and butyl methacrylate; acrylonitrile, methacrylonitrile, acrylamide; and the like. Preferred toner resins in admixture with resins include styrene butadiene copolymers, mixtures thereof, and the like. Other preferred toner resins include styrene/n-butyl copolymers, PLIOLITES®, and suspension polymerized styrene butadienes, reference U.S. Pat. No. 4,558,108, the disclosure of which is totally incorporated herein by reference.

In the toner compositions, the resin particles are present in a sufficient but effective amount, for example from about 70 to about 90 weight percent. Thus, when 1 percent by weight of the charge enhancing additive is present, and 10 percent by weight of pigment or colorant, such as carbon black, is contained therein, about 89 percent by weight of resin is selected. Also, the charge enhancing additive may be coated on the pigment particle. When used as a coating, the charge enhancing additive is present in an amount of from about 0.1 weight percent to about 5 weight percent, and preferably from about 0.3 weight percent to about 1 weight percent.

Numerous well known suitable pigments or dyes can be selected as the colorant for the toner particles including, for example, carbon black like REGAL 330®, nigrosine dye, aniline blue, magnetite, or mixtures thereof. The pigment, which is preferably carbon black, should be present in a sufficient amount to render the toner composition highly colored. Generally, the pigment particles are present in amounts of from about 1 percent by weight to about 20 percent by weight, and preferably from about 2 to about 10 weight percent based on the total weight of the toner composition; however, lesser or greater amounts of pigment particles can be selected.

When the pigment particles are comprised of magnetites, thereby enabling single component toners in some instances, which magnetites are a mixture of iron oxides ($FeO \cdot Fe_2O_3$) including those commercially available as MAPICO BLACK®, they are present in the toner composition in an amount of from about 10 percent by weight to about 70 percent by weight, and preferably in an amount of from about 10 percent by weight to about 50 percent by weight. Mixtures of carbon black and magnetite with from about 1 to about 15 weight percent of carbon black, and preferably from about 2 to about 6 weight percent of carbon black, and magnetite, such as MAPICO BLACK®, in an amount of, for example, from about 5 to about 60, and preferably from about 10 to about 50 weight percent can be selected.

There can also be blended with the toner compositions of the present invention external additive particles including flow aid additives, which additives are usually present on the surface thereof. Examples of these additives include colloidal silicas, such as AEROSIL®, metal salts and metal salts of fatty acids inclusive of zinc stearate, aluminum oxides, cerium oxides, and mixtures thereof, which additives are generally present in an amount of from about 0.1 percent by weight to about 5 percent by weight, and preferably in an amount of from about 0.1 percent by weight to about 1 percent by weight. Several of the aforementioned additives are illustrated in U.S. Pat. Nos. 3,590,000 and 3,800,588, the disclosures of which are totally incorporated herein by reference.

With further respect to the present invention, colloidal silicas, such as AEROSIL®, can be surface treated with the charge additives in an amount of from about 1 to about 30 weight percent and preferably 10 weight percent followed by the addition thereof to the toner in an amount of from 0.1 to 10 and preferably 0.1 to 1 weight percent.

Also, there can be included in the toner compositions low molecular weight waxes, such as polypropylenes and polyethylenes commercially available from Allied Chemical and Petrolite Corporation, EPOLENE N-15® commercially available from Eastman Chemical Products, Inc., VISCOL 550-P®, a low weight average molecular weight polypropylene available from Sanyo Kasei K.K., and similar materials. The commercially available polyethylenes selected have a molecular weight of from about 1,000 to about 1,500, while the commercially available polypropylenes utilized for the toner compositions are believed to have a molecular weight of from about 4,000 to about 5,000. Many of the polyethylene and polypropylene compositions useful in the present invention are illustrated in British Patent No. 1,442,835, the disclosure of which is totally incorporated herein by reference.

The low molecular weight wax materials are optionally present in the toner composition or the polymer resin beads of the present invention in various amounts, however, generally these waxes are present in the toner composition in an amount of from about 1 percent by weight to about 15 percent by weight, and preferably in an amount of from about 2 percent by weight to about 10 percent by weight and may in embodiments function as fuser roll release agents.

Encompassed within the scope of the present invention are colored toner and developer compositions comprised of toner resin particles, carrier particles, the charge enhancing additives illustrated herein, and as pigments or colorants red, blue, green, brown, magenta, cyan and/or yellow particles, as well as mixtures thereof. More specifically, with regard to the generation of color images utilizing a developer composition with charge enhancing additives, illustrative examples of magenta materials that may be selected as pigments include, for example, 2,9-dimethyl-substituted quinacridone and anthraquinone dye identified in the Color Index as CI 60710, CI Dispersed Red 15, diazo dye identified in the Color Index as CI 26050, CI Solvent Red 19, and the like. Illustrative examples of cyan materials that may be used as pigments include copper tetra-4-(octadecyl sulfonamido)phthalocyanine, X-copper phthalocyanine pigment listed in the Color Index as CI 74160, CI Pigment Blue, and Anthrathrene Blue, identified in the Color Index as CI 69810, Special Blue X-2137, and the like; while illustrative examples of yellow pigments that may be selected are diarylide yellow 3,3-dichlorobenzidene acetoacetanilides, a monoazo pigment identified in the Color Index as CI 12700, CI Solvent Yellow 16, a nitrophenyl amine sulfonamide identified in the Color Index as Foron Yellow SE/GLN, CI Dispersed Yellow 33, 2,5-dimethoxy-4-sulfonanilide phenylazo-4'-chloro-2,5-dimethoxy acetoacetanilide, and Permanent Yellow FGL. The aforementioned pigments are incorporated into the toner composition in various suitable effective amounts providing the objectives of the present invention are achieved. In embodiments, these colored pigment particles are present in the toner composition in an amount of from about 2 percent by weight to about 15 percent by weight calculated on the weight of the toner resin particles.

For the formulation of developer compositions, there are mixed with the toner particles carrier components, particularly those that are capable of triboelectrically assuming an opposite polarity to that of the toner composition. Accordingly, the carrier particles are selected to be of a negative polarity enabling the toner particles, which are positively charged, to adhere to and surround the carrier particles. Illustrative examples of carrier particles include iron powder, steel, nickel, iron, ferrites, including copper zinc ferrites, and the like. Additionally, there can be selected as carrier particles nickel berry carriers as illustrated in U.S. Pat. No. 3,847,604, the disclosure of which is totally incorporated herein by reference. The selected carrier particles can be used with or without a coating, the coating generally containing terpolymers of styrene, methylmethacrylate, and a silane, such as triethoxy silane, reference U.S. Pat. No. 3,526,533, U.S. Pat. No. 4,937,166, and U.S. Pat. No. 4,935,326, the disclosures of which are totally incorporated herein by reference, including for example KYNAR® and polymethylmethacrylate mixtures (40/60). Coating weights can vary as indicated herein; generally, however, from about 0.3 to about 2, and preferably from about 0.5 to about 1.5 weight percent coating weight is selected.

Furthermore, the diameter of the carrier particles, preferably spherical in shape, is generally from about 50 microns to about 1,000 microns, and in embodiments about 175 microns thereby permitting them to possess sufficient density and inertia to avoid adherence to the electrostatic images during the development process. The carrier component can be mixed with the toner composition in various suitable combinations, however, best results are obtained when about 1 to 5 parts per toner to about 10 parts to about 200 parts by weight of carrier are selected.

The toner composition of the present invention can be prepared by a number of known methods as indicated herein including extrusion melt blending the toner resin particles, pigment particles or colorants, and a charge enhancing additive, followed by mechanical attrition. Other methods include those well known in the art such as spray drying, melt dispersion, emulsion aggregation, and extrusion processing. Also, as indicated herein the toner composition without the charge enhancing additive in the bulk toner can be prepared, followed by the addition of charge additive surface treated colloidal silicas.

The toner and developer compositions may be selected for use in electrostatographic imaging apparatuses containing therein conventional photoreceptors providing that they are capable of being charged positively or negatively. Thus, the toner and developer compositions can be used with layered photoreceptors that are capable of being charged negatively, such as those described in U.S. Pat. No. 4,265,990, the disclosure of which is totally incorporated herein by reference. Illustrative examples of inorganic photoreceptors that may be selected for imaging and printing processes include selenium; selenium alloys, such as selenium arsenic, selenium tellurium and the like; halogen doped selenium substances; and halogen doped selenium alloys.

The toner compositions are usually jetted and classified subsequent to preparation to enable toner particles with a preferred average diameter of from about 5 to about 25 microns, and more preferably from about 8 to about 12 microns. Also, the toner compositions preferably possess a triboelectric charge of from about 0.1 to about 2 femtocoulombs per micron as determined by the known charge spectrograph. Admix time for toners are preferably from about 5 seconds to 1 minute, and more specifically from about 5 to about 15 seconds as determined by the known charge spectrograph. These toner compositions with rapid admix characteristics enable, for example, the development of images in electrophotographic imaging apparatuses, which images have substantially no background deposits thereon, even at high toner dispensing rates in some instances, for instance exceeding 20 grams per minute; and further, such toner compositions can be selected for high speed electrophotographic apparatuses, that is those exceeding 70 copies per minute.

Also, the toner compositions prepared from resins of the present invention possess desirable narrow charge distributions, optimal charging triboelectric values, preferably of from 10 to about 40, and more preferably from about 10 to about 35 microcoulombs per gram as determined by the known Faraday Cage methods with from about 0.1 to about 5 weight percent in one embodiment of the charge enhancing additive; and rapid admix charging times as determined in the charge spectrograph of less than 15 seconds, and more preferably in some embodiments from about 1 to about 14 seconds.

The following Examples are being supplied to further define various species of the present invention, it being noted that these Examples are intended to illustrate and not limit the scope of the present invention. Parts and percentages are by weight unless otherwise indicated.

The polymerization reactions were carried out in a 100 mL round bottom flask equipped with mechanical stirrer, condenser, and argon inlet/outlet at 125° C., and molecular weights were determined by GPC. The reactants and electron acceptor additives used in Examples I to IV and the resulting benzoyl peroxide (BPO) initiated TEMPO terminated, polymer polydispersities are given in the accompanying Table 1 along with relevant control examples. Of particular interest are the results observed for control I wherein only monomer or low molcular weight products, below about 800 molecular weight, were obtained in the absence of the electron acceptor compound. As disclosed in commonly owned U.S. Pat. No. 5,412,047, considerably higher molecular weight homopolymeric n-butylacrylates could be obtained under similar reaction conditions with the exceptions that considerably longer reaction times and commerically available, that is, unpurified 4-oxo-TEMPO were used. In the present invention the 4-oxo-TEMPO is purified by recrystallizing from hexane, and which purified material appears to perform significantly differently from the unpurified material.

EXAMPLE I

Electron Acceptor (TCNQ) SFR Polymerization of n-Butylacrylate

To a 100 mL round bottom flask under an argon atmosphere was added n-butylacrylate (15 mL), azoisobutyronitrile (0.050 g, 0.305 mmol) and 4 oxo-TEMPO (0.084 g, 0.488 mmol). This was heated in a preheated oil bath to 120° C. for a 5 minute period and then heated to 135° C. over a further 5 minutes. After 30 minutes at temperature TCNQ (0.174 g, 0.854 mmol) was added and the reaction mixture was stirred for 7.5 hours. This yielded a poly(n-butylacrylate) of $M_w$=6,543 (relative to styrene) and a polydispersity (Mw/Mn) PD=1.47. Conversion from monomer to polymer as determined by isolated product was 9.7%.

EXAMPLE II

Electron Acceptor (TCNQ) SFR Polymerization of Acrylamide

To a 100 mL round bottom flask under an argon atmosphere was added acrylamide (6.06 g, 0.085 mol), 4 oxo TEMPO (0.289 g, 1.7 mmol), azoisobutyronitrile (0.279 g, 1.7 mmol) and TCNQ (0.381 g, 1.9 mmol). The solution was heated to 130° C. over a 30 minute period and maintained at reflux for 8 hours. This yielded a polyacrlyamide with $M_w$=6,424 and PD=1.65.

EXAMPLE III

Electron Acceptor (TCNQ) SFR Polymerization of n-Butylacrylate

To a 100 mL round bottom flask under an argon atmosphere was added n-butylacrylate (15 mL), azoisobutyronitrile (0.050 g, 0.305 mmol), TEMPO (0.076 g, 0.488 mmol) and TCNQ (0.159 g, 0.78 mmol). This was heated in a preheated oil bath to 120° C. for a 5 minute period and then heated to 135° C. over 5 minutes. The reaction was stirred for 8 hours and yielded a poly n-butylacrylate of $M_w$=3,093 relative to a polystyrene standard, and PD=1.35. Conversion as determined by isolated product was about 5%.

EXAMPLE IV

Electron Acceptor (TCNQ) as a Rate Enhancer in SFR Polymerization of Styrene

To a 100 mL round bottom flask under an argon atmosphere was added styrene (15 mL), azoisobutyronitrile (0.050 g, 0.305 mmol), 4 oxo TEMPO (0.084 g, 0.488 mmol) and TCNQ (1.46 g, 0.72 mmol). This was heated at 135° C. for 2.5 hours and yielded polystyrene of $M_w$=43,274 and PD=1.32. As a comparison example, in the absence of the electron acceptor compound TCNQ, the reaction yielded polystyrene of $M_w$=2,000 and a PD of 1.19 over a heating period of 5 hours.

EXAMPLE V

Electron Acceptor SFR (BCFM) as a Rate Enhancer in Polymerization of Styrene

To a 100 mL round bottom flask under an argon atmosphere was added styrene (15 mL), azoisobutyronitrile (0.050 g, 0.305 mmol), 4 oxo TEMPO (0.084 g, 0.488 mmol) and BCFM (0.05 g, 0.164 mmol). This was heated at 125° C. (oil bath) for 8 hours and yielded polystyrene of $M_w$=41,436 and PD=1.36.

EXAMPLE VI

Electron Acceptor SFR (TCNQ) Polymerization of n-Butylacrylate

To a 100 mL round bottom flask under an argon atmosphere was added n-butylacrylate (15 mL), azoisobutyronitrile (0.050 g, 0.305 mmol), 4 oxo-TEMPO (0.084 g, 0.488 mmol), TCNQ (0.201 g, 0.986 mmol) and benzoic acid (0.240 g, 1.97 mmol). The mixture was heated in a preheated oil bath to 120° C. for a 5 minute period and then heated to 145° C. (reflux) over a further 5 minutes then was stirred for 8 hours. This yielded a poly(n-butylacrylate) of $M_w$=18,222 relative to a poly styrene standard, and a polydispersity $(M_w/M_n)$ PD=1.62. Conversion of monomer to polymer as determined by isolated product was 42%.

EXAMPLE VII

Electron Acceptor (TCNQ) SFR Polymerization of n-Butylacrylate

To a 100 mL round bottom flask under an argon atmosphere was added n-butylacrylate (15 mL), azoisobutyronitrile (0.050 g, 0.305 mmol), 4 oxo-TEMPO (0.084 g, 0.488 mmol), and TCNQ (0.149 g, 0.732 mmol). This was heated in a preheated oil bath to 120° C. for a 5 minute period and then heated to 145° C. (reflux) over a further 5 minutes. Additional monomer (15 ml) was added at 1 hour and 4 hours. The heated reaction mixture was stirred for a total of 7 hours. This yielded a poly(n-butylacrylate) of $M_w$=22,614 relative to a polystyrene standard, and a polydispersity $(M_w/M_n)$ PD=1.49. Conversion of monomer to polymer as determined by isolated product was 16%.

EXAMPLE VIII

Electron Acceptor SFR (TCNQ) Polymerization of n-Butylacrylate

To a 100 mL round bottom flask under an argon atmosphere was added n-butylacrylate (15 mL), azoisobutyronitrile (0.050 g, 0.305 mmol), 4 oxo-TEMPO (0.084 g, 0.488 mmol), TCNQ (0.149 g, 0.732 mmol) and tripropylamine (0.047 g, 0.333 mmol). This was heated in a preheated oil bath to 120° C. for a 5 minute period and then heated to 145° C. (reflux) over a further 5 minutes. The reaction mixture was stirred for 7 hours. This yielded a poly(n-butylacrylate) of $M_w$=11,467 relative to a polystyrene standard, and a polydispersity $(M_w/M_n)$ PD=1.33. Conversion from monomer to polymer as determined by isolated product was 15%.

EXAMPLE IX

Magnetic Toner Preparation and Evaluation

The polymer resin (74 weight percent of the total mixture) obtained by the stable free radical polymerization processes in Example I or an equivalent copolymer with styrene may be melt extruded with 10 weight percent of REGAL 330® carbon black and 16 weight percent of MAPICO BLACK® magnetite at 120° C., and the extrudate pulverized in a Waring blender and jetted to 8 micron number average sized particles. A positively charging magnetic toner may be prepared by surface treating the jetted toner (2 grams) with 0.12 gram of a 1:1 weight ratio of AEROSIL R972® (Degussa) and TP-302 a naphthalene sulfonate and quaternary ammonium salt (Nachem/Hodogaya SI) charge control agent.

Developer compositions may then be prepared by admixing 3.34 parts by weight of the aforementioned toner composition with 96.66 parts by weight of a carrier comprised of a steel core with a polymer mixture thereover containing 70 percent by weight of KYNAR®, a polyvinylidene fluoride, and 30 percent by weight of polymethyl methacrylate; the coating weight being about 0.9 percent. Cascade development may be used to

TABLE 1

| Example | Monomer | Initiator | Nitroxide | EA | $M_w$ | Polydispersity |
|---|---|---|---|---|---|---|
| I | n-Butyl Acrylate | AIBN | oxoTEMPO | TCNQ | 6,543 | 1.41 |
| II | acrylamide | AIBN | oxoTEMPO | TCNQ | 6,424 | 1.65 |
| III | n-Butyl Acrylate | AIBN | TEMPO | TCNQ | 3,093 | 1.5 |
| IV | Styrene | AIBN | oxoTEMPO | TCNQ | 43,274 | 1.32 |
| V | Styrene | AIBN | oxoTEMPO | BCFM | 41,436 | 1.36 |
| VI | n-Butyl Acrylate | AIBN | oxoTEMPO | TCNQ | 18,222 | 1.62 |
| VII | n-Butyl Acrylate | AIBN | oxoTEMPO | TCNQ | 22,614 | 1.49 |
| VIII | n-Butyl Acrylate | AIBN | oxoTEMPO | TCNQ | 11,467 | 1.33 |
| Control I | n-Butyl Acrylate | AIBN | oxoTEMPO | none | Monomer only to 800 | — |
| Control II | Styrene | AIBN | oxoTEMPO | none | 2,000 | 1.19 | develop a Xerox Model D photoreceptor using a "negative" target. The light exposure may be set between 5 and 10 seconds and a negative bias used to dark transfer the positive toned images from the photoreceptor to paper.

Fusing evaluations may be carried out with a Xerox Corporation 5028® soft silicone roll fuser, operated at 7.62 cm (3 inches) per second.

The minimum fix and hot offset temperatures of stable free radical polymerization polymers having narrow polydispersities as toners are expected to be improved over toners prepared from resins synthesized by a free radical polymerization process without a stable free radical agent present affording broad polydispersities. The actual fuser roll temperatures may be determined using an Omega pyrometer and was checked with wax paper indicators. The degree to which a developed toner image adhered to paper after fusing is evaluated using a Scotch® tape test. The fix level is expected to be excellent and comparable to that fix obtained with toner compositions prepared from other methods for preparing toners having resins with high molecular weights and narrow polydispersities. Typically greater than 95 percent of the toner image remains fixed to the copy sheet after removing a tape strip as determined by a densitometer.

Images may be developed in a xerographic imaging test fixture with a negatively charged layered imaging member comprised of a supporting substrate of aluminum, a photogenerating layer of trigonal selenium, and a charge transport layer of the aryl amine N,N'-diphenyl-N,N'-bis(3-methylphenyl)1,1'-biphenyl-4,4'-diamine, 45 weight percent, dispersed in 55 weight percent of the polycarbonate MAKROLON®, reference U.S. Pat. No. 4,265,990, the disclosure of which is totally incorporated herein by reference; images for toner compositions prepared from the copolymers derived from for example, Example XI are expected to be of excellent quality with no background deposits and of high resolution over an extended number of imaging cycles exceeding, it is believed, about 75,000 imaging cycles.

Other toner compositions may be readily prepared by conventional means from the polymer and copolymer resins of the present invention including colored toners, single component toners, multi-component toners, toners containing special performance additives, and the like.

The stable free radical agent moderated polymerization processes of the present invention may be applied to a wide range of free radical reactive organic monomers, and particularly those with little or no reactivity under stable free radical polymerization conditions in the absence of the electron acceptor compound, to provide novel toner resin materials with desirable electrophotographic properties. For example, homoacrylate containing block copolymers have application as dispersents for photoreceptor pigments. The multimodal resins have application to low melt resins and certain monomodal resins may be used to modify the surface of carbon black and pigment particles to make the pigment particles more miscible with a host polymer or dispersing medium. Narrow molecular weight resins such as mixtures of poly(styrene-b-n-butyl acrylate) and poly(butyl acrylate) find application as improved toner resins for general application and particularly for detoning or deinking applications which may be achieved by heating at elevated temperatures in aqueous alkali solutions.

The aforementioned patents and publications are incorporated by reference herein in their entirety.

Other modifications of the present invention may occur to those skilled in the art based upon a review of the present application and these modifications, including equivalents thereof, are intended to be included within the scope of the present invention.

What is claimed is:

1. A process for the preparation of thermoplastic resin comprising:

heating a mixture comprised of a free radical initiator, a stable free radical agent, at least one polymerizable monomer compound and an electron acceptor (EA) compound, to form a thermoplastic resin containing a homopolymeric segment or segments and wherein said process possesses a high monomer to polymer conversion and a narrow polydispersity.

2. A process in accordance with claim 1 wherein the electron acceptor compound is selected from the group consisting of quinodimethane compounds, anthraquinodimethane compounds, fluorenylidene compounds, ferrocene coompounds, nitroarene compounds, cyanoarene compounds, aromatic compounds with from 6 to 24 carbon atoms and having electron withdrawing substituents selected form the group consisting cyano and nitro, and mixtures thereof.

3. A process in accordance with claim 1 wherein the electron acceptor compound is thermally and chemically stable to the polymerization process conditions.

4. A process in accordance with claim 1 wherein the electron acceptor compound to free radical initiator molar ratio is from about 0.1 to 3.0.

5. A free radical polymerization process for the preparation of thermoplastic resin comprising:

heating from about 100° to about 200° C. for a time period of about 30 minutes to about 10 hours a mixture comprised of an azobisalkylnitrile free radical initiator, a nitroxide stable free radical agent, an electron acceptor compound, and at least one free radical polymerizable acrylate or acrylamide monomer compound to form said thermoplastic resin;

cooling said solution;

optionally isolating said thermoplastic resin; and optionally washing and drying said thermoplastic resin, wherein said thermoplastic resin possesses a narrow polydispersity from about 1.1 to about 1.7, a modality of 1, wherein said resin contains from about 5 to about 4,000 contiguously bonded monomer units, and wherein a monomer to polymer conversion from about 10 to about 100 percent is achieved.

6. A process in accordance to claim 1 wherein the monomer is a styrene compound, and the electron acceptor is soluble in an organic solvent.

7. A process in accordance to claim 1 wherein the electron acceptor compound enhances the rate of the polymerization of monomers.

8. A polymerization process for the preparation of thermoplastic resin or resins comprising:

heating a mixture comprised of a free radical initiator, a stable free radical agent, at least one polymerizable monomer compound with low reactivity under stable free radical polymerization conditions, and an electron acceptor (EA) compound, to form a thermoplastic resin or resins containing a homopolymeric segment or segments comprised of contiguously polymerized low reactivity monomers, with a high monomer to polymer conversion and narrow polydispersity.

9. A process for the preparation of thermoplastic resin comprising: heating a mixture comprised of a free radical initiator, a stable free radical agent, at least one polymerizable monomer compound an electron acceptor (EA) compound, an electron donor (ED) compound in an amount of from about 1:1 to about 0.1:1.0 molar ratio relative to the electron acceptor compound, wherein the electron donor compound is selected from the group consisting of fulvalene compounds, tetrathiafulvalenes compounds, arylamino coumpounds, alkylamino compounds, hydroxyaryl compounds, hyroxyalkyl compounds, and mixtures thereof, to form a thermoplastic resin containing a homopolymeric segment or segments and wherein said process possesses a high monomer to polymer conversion and a narrow polydispersity.

* * * * *